April 6, 1965  L. R. McROBERT  3,176,831
ROOT CROP HARVESTER CONVEYOR
Original Filed Feb. 9, 1960  2 Sheets-Sheet 1
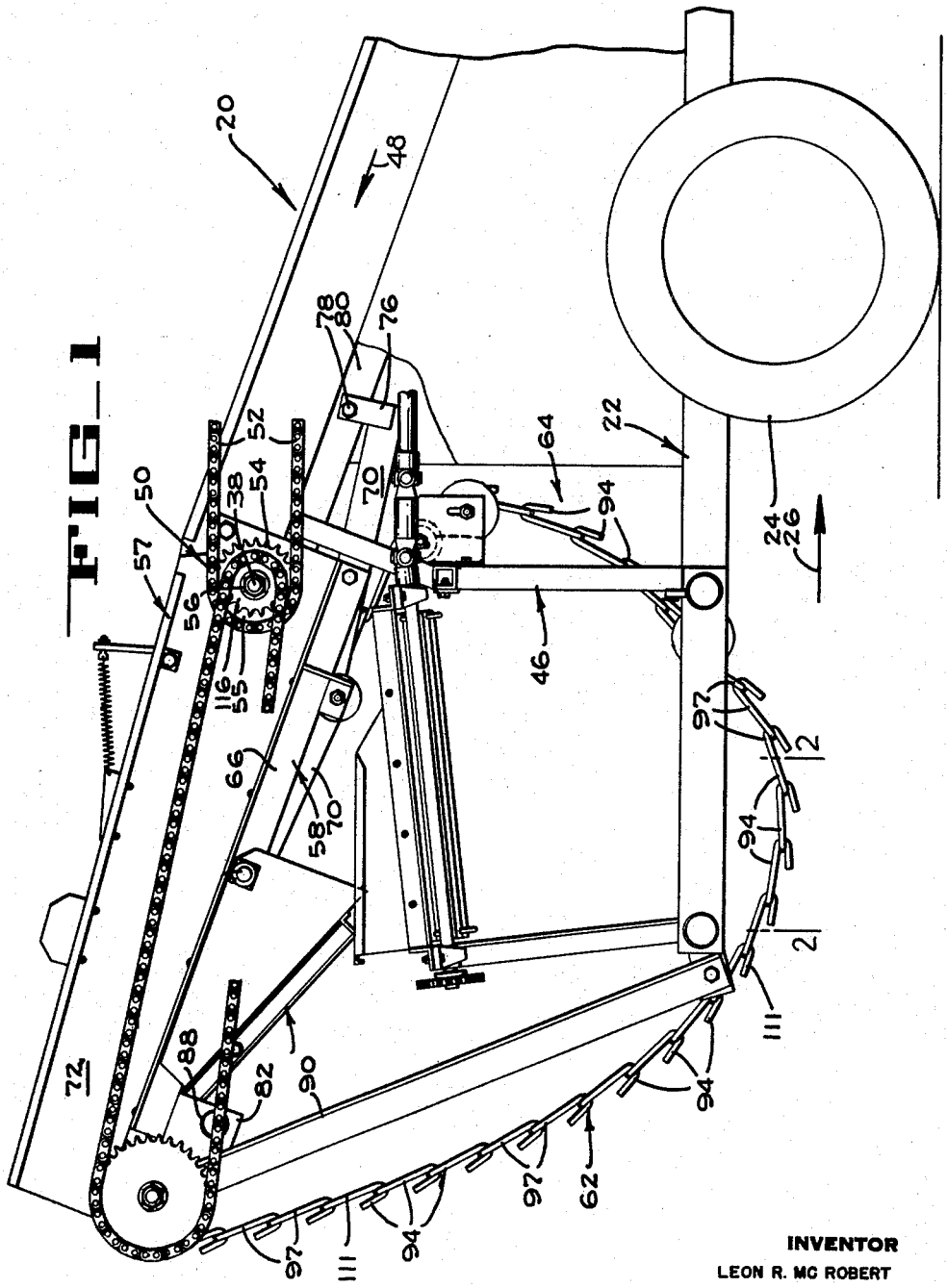
INVENTOR
LEON R. MC ROBERT
BY Hans G. Hoffmeister
ATTORNEY

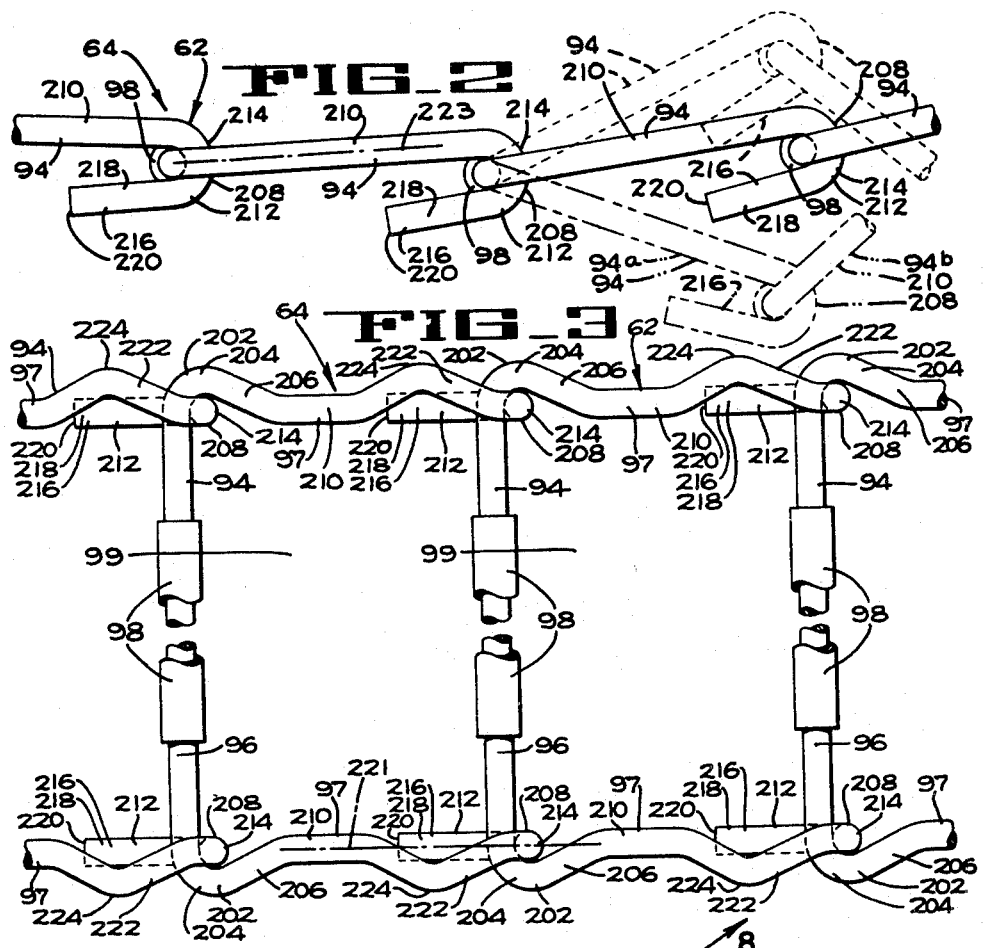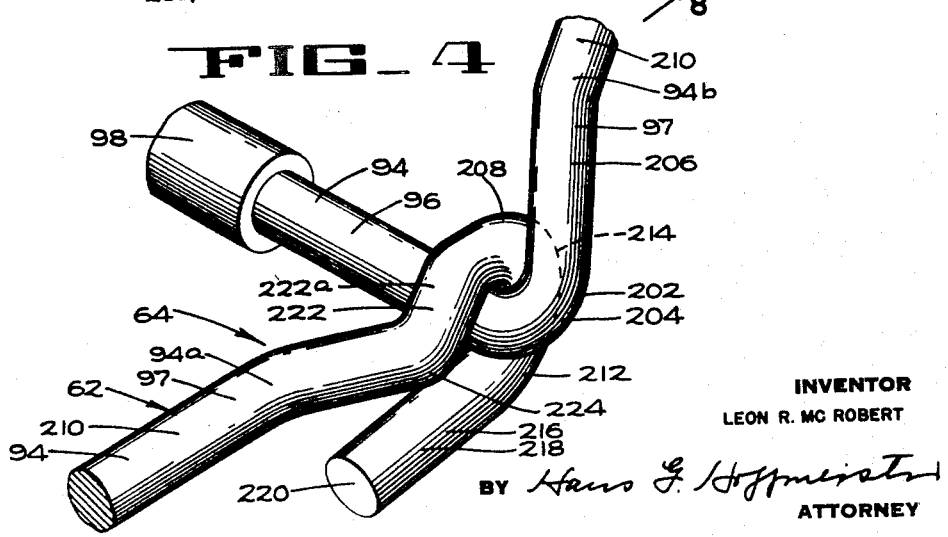

United States Patent Office 3,176,831
Patented Apr. 6, 1965

3,176,831
ROOT CROP HARVESTER CONVEYOR
Leon R. McRobert, Williamston, Mich., assignor to FMC Corporation, San Jose, Calif., a corporation of Delaware
Original application Feb. 9, 1960, Ser. No. 7,645, now Patent No. 3,125,097, dated Mar. 17, 1964. Divided and this application Feb. 15, 1962, Ser. No. 173,546
5 Claims. (Cl. 198—195)

The present invention appertains to machines for harvesting a root crop such as potatoes, and relates more particularly to an improved conveyor for conveying plant tops and roots in a root crop harvester.

This application is a division of the pending application of Leon R. McRobert, Serial No. 7,645 filed February 9, 1960, Patent No. 3,125,097.

Although the conveyor of the present invention will be described in the specification and referred to in the claims as used in harvesting potatoes it is to be particularly understood that it can be successfully employed in conveying any of several different root crops or crops of a closely related character.

An object of the present invention is to provide an improved conveyor for root crops.

Another object is to provide an improved conveyor chain particularly adapted for use in apparatus of the type mentioned.

These and other objects and advantage of the present invention will become apparent from the following description and the accompanying drawings, in which:

FIGURE 1 is a fragmentary side elevation of a potato harvester to which the apparatus of the present invention is operatively attached.

FIGURE 2 is an enlarged side elevation of the portion of the conveyor chain included between lines 2—2 of FIG. 1.

FIGURE 3 is a plan, partly broken away, of the conveyor chain shown in FIG. 2.

FIGURE 4 is an enlarged fragmentary perspective showing the connection between two links at one side of the conveyor chain shown in FIGS. 2 and 3 with the links in different positions and viewed from above in the direction indicated by the arrow 4 in FIG. 3.

The potato harvester 20 comprises a chassis 22 (FIG. 1) having transport wheels 24 (only one shown, FIG. 1). The harvester 20 is moved along the rows of potato plants (not shown) on the wheels 24 in the direction indicated by the arrow 26 by any well known means, and digs the potato plants in two adjoining rows, by means not shown. The potatoes, their plant tops and roots along with some clods, loose earth and rocks are delivered onto a pickup conveyor which is upwardly and rearwardly inclined and includes two similar, endless conveyor chains in side by side relation, each having a plurality of equally spaced, transverse flights. The upper end 34 of the conveyor 28 is supported at a suitable height by a generally upright frame 46 which extends between and is secured to the chassis 22 and to the housing 44.

The pickup conveyor 28 is driven in the direction indicated by the arrow 48 by a chain and sprocket drive 50. A chain 52 of the drive 50 is connected to a source of suitable power (not shown) on the harvester 20 and is trained about a sprocket 54 of a double sprocket 55 which is freely rotatable on a drive shaft 38. A spring biased, overload clutch 56 releasably connects the double sprocket 55 in driving engagement with the shaft 38 to drive the same by means of the chain 52.

As the potatoes, the plant tops and the roots are carried upward by the pickup conveyor, many clods and stones and much of the loose earth falls between the closely spaced flights back to the ground while the vine-like plant tops and roots, hereinafter called "trash," and the potatoes remain on the conveyor. The potatoes and trash are discharged from the conveyor at the end thereof onto the apparatus of the present invention, hereinafter called the trash eliminator 57, which efficiently separates the trash from the potatoes.

The trash eliminator 57 comprises a generally rectangular frame 58 (FIG. 1) by which oblique runs of two side-by-side endless chains 62 (FIG. 2) are operatively supported. The oblique runs provide an elongate extension (FIG. 4) of the pickup conveyor and will hereinafter be referred to as the trash eliminator conveyor 64. The rectangular frame 58 comprises two opposite angle bars 66 one only being shown in FIG. 1, and extending longitudinally of the conveyor 64, and a central, longitudinally extending bar 70 located midway between the angle bars 66. The angle bars 66 have elongate, upstanding walls 72 fixed thereto which are secured adjacent the front end of the frame 58, and provide aligned extensions thereof. As seen in FIG. 1, the adjacent end portion of the central bar 70 extends beneath the housing 44 and has an upstanding bracket 76 bolted at 78 to a reinforcing bar 80 extending longitudinally of and secured to the housing 44. The ends of the angle bars 66 and the bar 70 at the inner or front of the conveyor 64 are thus held in laterally spaced relation at equal intervals. Vertical plates 82, fixed to and projecting downwardly from the angle bars 66 and 68 and the bar 70, respectively, at the outer or rear end of the frame 58, are secured to a transverse beam 88 which cooperates with the housing 44 to retain these bars in parallel relation. Opposite support legs 90, fixed to and extending between the plates 82 and the chassis 22 hold the rear end of the frame 58 at a suitable height above the discharge end of the pickup conveyor. The upwardly inclined frame 58 supports the conveyor 64 in a manner to be more fully explained, with the side walls 72 and 74 in fixed positions at opposite sides thereof.

The two endless chains 62 of the trash eliminator conveyor 64 each comprises a series of interlocked links 94 of corresponding construction. Each link 94 (FIG. 3) is of U-shaped configuration and includes a bight portion 96 from which opposite legs 47 project. The bight portions 96 have resilient coverings 98 of material such as rubber and are equally spaced throughout the chains 62. The adjacent bights 96, which extend the full width of the chains function as transversely extending flights and are spaced apart to provide openings 99 therebetween of a size permitting the largest potatoes to pass easily through the chains 62.

In FIGS. 2 and 3 a portion of the lower run of the chains 62 is shown. It will be seen that the links 94 of the chain 62 are of corresponding U-shaped configuration and are each formed from a bar having a circular cross section. The opposite legs 97 of each link project generally at right angles to the associated bight 96 and project in leading relation with resepct thereto in the chain 62 (FIG. 1). The juncture 202 between the bight portion 96 and each leg 97 (FIG. 3) includes a rounded portion 204 adjoining the bight 96 and a straight, inclined stop portion 206. The inclined stop portion 206 extends inwardly of the link from the rounded portion 204 toward the longtiudinal centerline of the chain. A central portion 210 of each leg 97 extends toward the leading end 208 thereof from the inclined stop portion 206 at substantially a right angle to the associated bight portion 96. In this way the central portions 210 of each link 94 are offset inwardly of the link from the ends of the bight portion a distance equal to the thickness of the bar from which the link is made. Beyond the central portion 210, an end portion 212 of each leg 97 includes a downward, return bend 214

(FIGS. 2 and 4) of approximately 180°, thereby providing each leg with an elongate hook 216. The hook 216 includes a straight end portion 218, hereinafter called the point, which is located between the bend 214 and the terminal end 220 of the associated leg. As shown best in FIG. 2, the point 218 diverges from the bend 214 with respect to the central portion 210. It will be apparent (FIGS. 2 and 3) that the longitudinal axis of the generally cylindrical point 218 and the axis of the cylindrical central portion 210 of each leg 97 define a plane indicated by the broken line 221 (FIG. 3) and extending at a right angle to a plane indicated by the broken line 223 (FIG. 2) and including the axes of the associated bight portion 96 and the central portions 210 of the two legs of each link. The hooks 216 of each link 94 receive in engagement with the bends 214 thereof the bight portion 96 of the adjacent preceding link 94, adjacent the opposite junctures 202, to pivotally interconnect the links. When the links 94 are so connected, the bights 96 extend transversely of the chain 62 and the central portions 210 and the points 218 of the legs 97 are aligned longitudinally of the chain and are adapted to engage the sprockets 106, to maintain lateral alignment of the chains 62.

It is easily possible for the interconnected links of known chains of the present type to slide toward each other and become unhooked if the legs of one link are swung about the axis of their bight portion 96 to approximately any position within an arc of more than 180° relative to the legs of a link connected therewith. For this reason the legs 97 of the links 94 are each provided with an abutment 222 to prevent the links of the chain from becoming unhooked during use.

The abutment 222 of each leg 97 is inclined outward from the free end 208 and away from plane 221 in the plane 223. The outer end 224 of each abutment 222 is located opposite the associate point 218 and is laterally offset from the point 218 and return bend 214. The distance between the ends 224 of the opposite abutments 222 of each link 94 is substantially the same as the width of the links at the opposite junctures 202. Thus, it will be apparent from FIGS. 3 and 4 that, during operation of the harvester 20, if two links 94a, and 94b (FIGS. 2 and 4) of the chain 62 move into the position shown in dot-dash lines (FIG. 2) these links are prevented by the abutments 222a (one shown, FIG. 4) from moving toward each other. Any attempt by these links, when so positioned, to move toward each other and become disconnected is prevented by engagement of one or both stop portions 206 of the link 94b (FIG. 4) with one or both abutments 222a of the link 94a.

It is to be understood that, although the abutments 222 do prevent accidental disconnection of the links 94 while the chain 62 is in use, they do not prevent disconnection of the links 94 when two such interconnected links are pivoted into a position such as that shown in dotted lines (FIG. 2) which is opposite to that shown in the dot-dash lines. When two interconnected links are in the positions of the links shown in dotted lines they can easily be disconnected by moving these links toward each other. The manner of connecting the links 94 is apparent from the foregoing description.

It will be apparent that the trash eliminator 57 operates efficiently to separate potatoes from the trash and prevent the build-up of debris on the chute floor 134. Additionally, the configuration of the links 94 assures that the links will remain connected in the chains 62 during harvesting operations.

While a particular embodiment of the present invention has been shown and described it will be understood that the apparatus of the present invention is capable of modification and variation without departing from the principles of the invention and that the scope of the invention should be limited only by the scope and proper interpretation of the claims appended hereto.

The invention having thus been described, what is believed to be new and desired to be protected by Letters Patent is:

1. In a conveyor, a chain having a plurality of interconnected links each comprising a bight portion, opposite legs projecting from said bight portion, each leg including a straight central portion disposed in a first plane extending longitudinally of the leg and a stop portion adjacent said bight portion and having a contact area in a second plane spaced from said first plane and generally parallel thereto, a return bend in each leg spaced from the terminal end thereof and providing the associated leg with a hook, the hooks of each link connecting the same to the bight portion of an adjacent link of the chain, each of said hooks having an end portion extending in said first plane between said return bend and said terminal end of the associated leg, and an abutment on each leg spaced from said bight portion and having a contact area disposed in said second plane, the contact area of an abutment on a leg of one link being engageable by the contact area of the stop portion of the associated leg of the adjacent link during relative pivotal movement of said links in one angular direction about an axis defined by the bight portion of said associated link.

2. In a conveyor, a chain having a plurality of interconnected links each comprising a bight portion having opposite legs projecting therefrom, each leg being disposed in a first plane extending longitudinally of the link, a stop portion at the junction of said bight portion and each leg and having a contact area disposed in spaced relation to the plane of the leg, a return bend in each leg spaced from the terminal end thereof and providing each leg with a hook remote from said bight portion, the hooks of each link connecting the same to the bight portion of an adjacent link of the chain, each of said hooks having an end portion extending between said return bend and said terminal end of the associated leg, and an abutment on each leg spaced from the bight portion and opposite the associated end portion, said abutments of each link being opposite each other and having contact areas disposed outwardly from said legs in the planes of the contact areas of the stop portions of the associated legs of the adjacent link to engage said contact areas to prevent the links of the chain from disconnecting incident to relative pivoting movement of the links in one angular direction about the axis defined by the bight portion of said adjacent link.

3. In a conveyor, a chain having a plurality of interconnected links each comprising a bight portion of predetermined length, opposite legs of uniform length projecting from opposite ends of said bight portion, each leg including an inclined portion extending from said bight portion to a central portion having parallel relation with the central portion of the other leg and spaced therefrom a shorter distance than said predetermined length of said bight portion, a return bend in each leg spaced from the terminal end thereof and providing each leg with a hook, the hooks of each link connecting the same to the bight portion of an adjacent link of the chain, each of said hooks having a point extending between said return bend and said terminal end of the associated leg, said point and said central portion of each leg providing guide surfaces extending in a plane at a right angle to a plane defined by the associated central portions, and an abutment on each leg opposite the associated point, said abutments being opposite each other and being disposed outwardly from said legs beyond the planes in which the associated central portions and the points of the legs extend, the distance between the outer ends of said abutment being greater than the predetermined length of said bight portion to enable said inclined portions of one link to engage the abutments of a link connected to the hooks of said links of the chain from disconnecting.

4. In a conveyor, a chain having a plurality of interconnected links each comprising a bight portion, opposite legs projecting from said bight portion, each leg including a straight central portion extending in a first plane and an inclined portion extending inwardly from the outer end of the bight portion to said central portion, a return bend in each leg spaced from the terminal end thereof and providing the associated leg with a hook, the hooks of each link connecting the same to the bight portion of an adjacent link of the chain, each of said hooks having a point extending in said first plane between said return bend and said terminal end of the associated leg, and an abutment on one leg of each link opposite the associated point on said one leg, said abutment of each link being adapted to engage the inclined portion of a leg of the adjacent link when interconnected links are pivoted in one direction to thereby prevent the links of the chain from moving to a link-disconnecting position, and said point being arranged to permit said inclined portion to pass said point and move toward link-disconnecting position.

5. In a conveyor, a chain link of U-shaped configuration comprising a bight portion having opposite legs projecting therefrom in a first plane, a stop portion at the junction of each leg and said bight portion spaced outwardly from said plane, a return bend in each leg spaced from the terminal end thereof and providing each leg with a hook remote from said bight portion, each hook having an end portion extending between said return bend and said terminal end thereof, said end portion and said return bend of each leg providing a guide surface extending in a plane at a right angle to said first plane, and an abutment on each leg spaced from said bight portion and opposite the associated end portion, said abutments being opposite each other, each abutment projecting outwardly from its leg beyond the plane in which the end portion thereof extends to engage the stop portion on a leg of the associated link incident to relative pivoting movement of the links in one angular direction about an axis defined by the bight portion of said associated link.

References Cited by the Examiner
UNITED STATES PATENTS 1,408,969   3/22   Aspinwall _____ 209—308

FOREIGN PATENTS 848,028   9/52   Germany.

SAMUEL F. COLEMAN, *Acting Primary Examiner.*

EDWARD A. SROKA, ERNEST A. FALLER, Jr.,
*Examiners.*